(No Model.)

A. ÅBERG.
METHOD OF AND APPARATUS FOR MEASURING ELECTRICITY.

No. 502,454. Patented Aug. 1, 1893.

WITNESSES:
Marion Hall
Charles Schroeder

INVENTOR.
A. Åberg
by Guepel & Raegener
ATTORNEYS.

UNITED STATES PATENT OFFICE.

ALOAR ÅBERG, OF HELSINGFORS, FINLAND.

METHOD OF AND APPARATUS FOR MEASURING ELECTRICITY.

SPECIFICATION forming part of Letters Patent No. 502,454, dated August 1, 1893.

Application filed January 10, 1893. Serial No. 457,880. (No model.) Patented in Finland February 23, 1892, No. 411.

*To all whom it may concern:*

Be it known that I, ALOAR ÅBERG, a subject of the Emperor of Russia, residing in Helsingfors, in the Grand Duchy of Finland and Empire of Russia, have invented certain new and useful Improvements in Methods of and Apparatus for Measuring Electricity, (for which Letters Patent were granted to me in Finland, No. 411, dated February 23, 1892,) of which the following is a specification.

This invention relates to improvements in a method of and apparatus for measuring the intensity of electric currents in conductors; and the object of my invention is to provide a device for thus measuring the currents without the use of any movable parts or any chemical decomposition.

This invention is based upon the fact discovered by Peltier that if two rods of different metals are connected at their ends and an electric current is conducted through the conductor thus formed, a heating or cooling action takes place at the point of connection of the two metals accordingly as the current passes through the same in one direction or the other. In making use of this phenomenon for measuring the intensity of electric currents, I arrange a Peltier-conductor such as described in a shunt-circuit and in an atmosphere of saturated vapors which are produced and maintained around said conductor and then pass the current in such a direction through said conductor as to produce a cooling action at the point of connection of the two metals. This cooling action causes a certain quantity of the said saturated vapors to condense, which condensed liquid is then collected and measured so as to indicate by its quantity the intensity of the current. Accordingly as a current of greater or less intensity is passed through the Peltier-conductor, the cooling action and consequently the condensation of the vapors is correspondingly greater or less, and it is evident that the quantity of liquid condensed within a certain time indicates the amount of current passed through the conductor in a given time.

Figure 1:
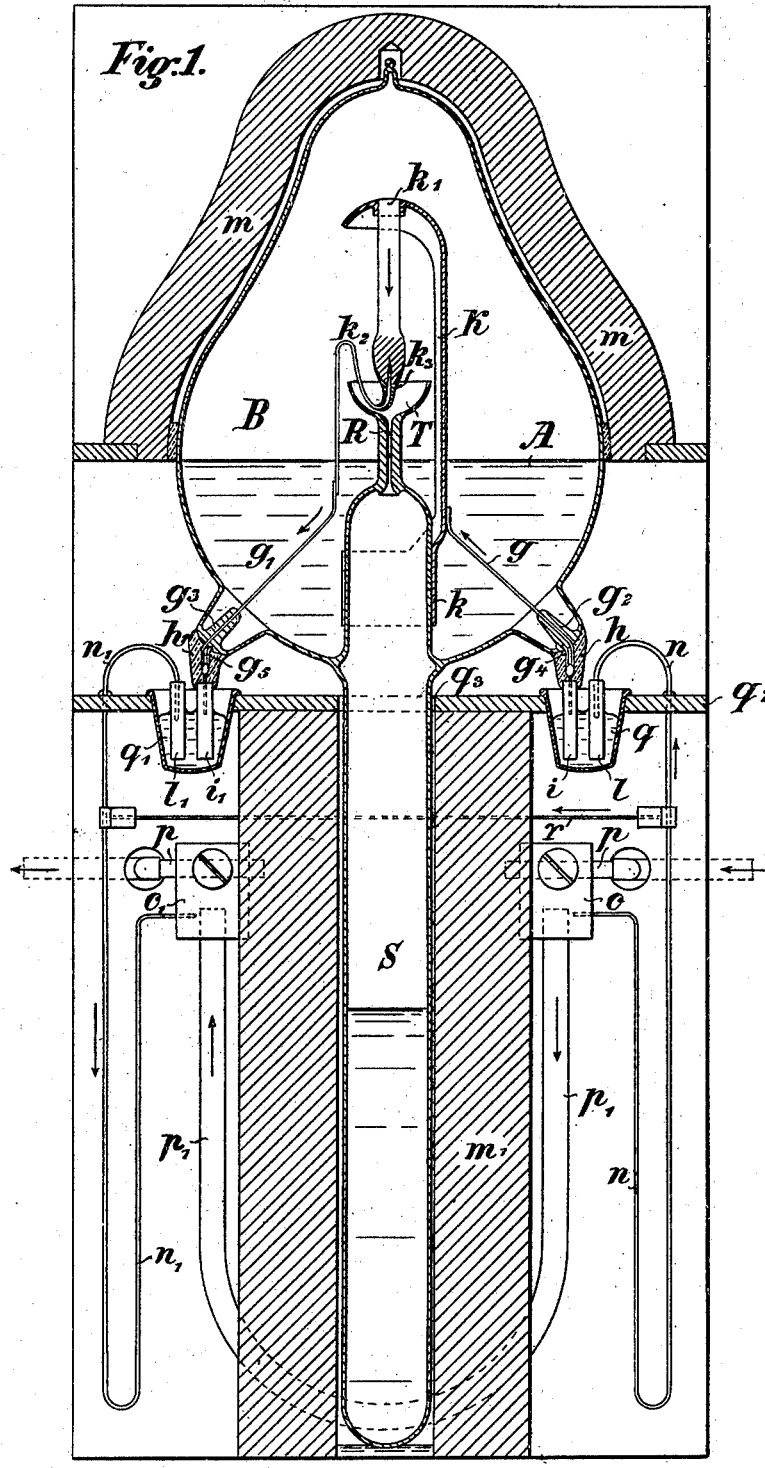
Figure 2:
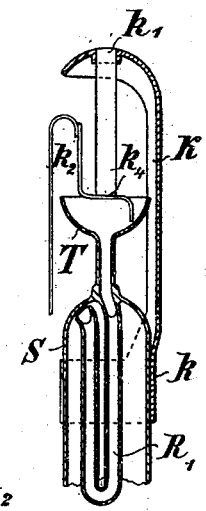

In the accompanying drawings, Figure 1 is a vertical longitudinal sectional view of my improved apparatus for measuring the intensity of electrical currents according to my improved method, and Fig. 2 is a vertical longitudinal sectional view of a part, showing a modified arrangement.

Similar letters of reference indicate corresponding parts.

I prefer to make the Peltier-conductor of bismuth and silver. Good results are also obtained with cobalt and iron or German silver and antimony and cadmium alloys. For producing the atmosphere of saturated vapors I use alcohols, but prefer absolute ethylalcohol.

As the Peltier-conductor is influenced by the changes of the temperature and the heat that is produced by the resistance offered by the two metals at the point of connection, provision must be made to avoid such influences as much as possible. In the drawings B is a hermetically closed glass bulb or vessel, which is preferably made in the shape of a pear, as shown. Through an opening in the bottom of the same and in line with the longitudinal axis of the vessel the tube S projects, the upper end of said tube passing a greater or less distance into the vessel B. Within the vessel the tube S is contracted to form the capillary tube R and the upper end is extended and widened to form a funnel or drip-cup T. Above and in line of the axis of said drip-cup the Peltier-conductor is arranged, which is formed of two rods $k'$ $k^2$ of different metals, for example, $k'$ of bismuth and $k^2$ of silver. The two metal rods must have such cross-section that they have equal conductivity, and for this reason the bismuth rod $k'$ has a greater cross-sectional area than the silver rod $k^2$. The rod $k'$ is held at its upper end in a metallic (preferably copper) holder or support K, which is provided at its lower end with a collar $k$ made integral therewith or attached thereto, and which is applied on the end of the tube S within the vessel B. The lower end of the rod $k^2$ projects into the drip-cup T to a point directly above the upper end of the capillary tube R; it is then bent upward over the top of the drip-cup and then in downward direction. The support K is connected with a platinum wire $g$ that is hermetically sealed in the walls of the vessel B at $g^2$ and passes through the same, and likewise the rod $k^2$ is connected with the platinum wire $g'$ that is hermetically sealed in the walls of the vessel B at $g^3$. The upper ends of the two platinum wires $g$ $g'$ are bent to form loops $g^4$ $g^5$ respectively, and these are arranged within blocks $h$ $h'$ respectively, formed of a non-conducting substance and attached to the closed vessel by means of a suitable cement. From the loop $g^4$ of the wire $g$ an electrode $i$ is suspended, and in the same manner an electrode $i'$ is suspended from the loop $g^5$ of the wire $g'$. Each of these two electrodes dips into a vessel $q$ $q'$ respectively, containing mercury, which vessels are held in apertures of a plate $q^2$ at opposite sides of the opening $q^3$, through which the tube S passes. In each of the said vessels $q$ $q'$ a second electrode $l$ $l'$ respectively is arranged and is connected by electrical resistances $n$ $n'$ with the two contact-pieces $o$ $o'$. These two contacts are arranged on the main conductor $p$ and are thus in shunt to the same, which shunt-circuit commences at the contact $o$ and includes the resistance $n$, electrode $l$, the mercury vessel $q$, electrode $i$, wire $g$, Peltier-conductor $k'$ $k^2$, wire $g'$, electrode $i'$, mercury vessel $q'$, electrode $l'$, resistance $n'$ and the contact-piece $o'$. Between the two resistances $n$ $n'$ a short circuit is produced by the wire $r$ in advance of the Peltier-conductor, which short circuit is parallel to said Peltier-conductor. The wire $r$ is of smaller cross-section than either of the resistances $n$ $n'$. The purpose of this short circuit will be explained hereinafter. The vessel B is closed hermetically and is partly filled with a volatile liquid A, such as absolute ethyl-alcohol. Before pouring this ethyl-alcohol into the vessel B the air is preferably exhausted from the same and after the liquid has been filled in the vessel is closed by melting the glass at the aperture. Between the measuring tube S and the vessel B an air-tight joint is formed by melting the parts together. Those parts of the vessel B not filled with the volatile liquid and also the measuring tube S are surrounded by jackets or layers $m$ $m'$ of a material that is a poor non-conductor of heat, for the purpose of protecting the apparatus as much as possible from the effects of the changes of temperature.

The operation is as follows: When a current is passed through the apparatus in the direction indicated by the arrows, a cooling action takes place at the contact-point of the two metal rods $k'$ $k^2$. This causes a condensation of some of the saturated vapors surrounding the Peltier-conductor, which vapors are deposited on the cool contact-point of the conductor. The condensed liquid then drops from the conductor into the funnel or drip-cup T and flows from the same through the capillary tube R into the measuring tube S. At the same time the condensed vapors are replaced by the evaporation of a corresponding portion of the fluid A. For the purpose of giving the cooled surface as large an area as possible, the point of contact of the two metal rods $k'$ $k^2$ can be provided with a coating of copper or silver $k^3$, by means of galvanic deposition, as shown in Fig. 1, which coating is made thicker at its middle portion and gradually decreased in thickness toward the ends.

In the modified construction shown in Fig. 2 a bent silver strip $k^4$ is arranged to establish connection between the rods $k'$ $k^2$, which strip has one end bent upward to connect with the rod $k^2$ and the other bent downward into the drip-cup T. The capillary tube R serves for the purpose of preventing any vapors which rise in the measuring tube S from passing into the vessel B or vice versa from passing from the vessel B into the measuring tube S. Fig. 2 shows the tube R' of the funnel extended down into the measuring tube S and then bent upward to form a hydraulic scale. The heat produced at the point of connection between the platinum wire $g$ and the support K and between the platinum wire $g'$ and the rod $k^2$, as also the heat that is generated by the resistance of those portions of the circuit which are located in the liquid, is transmitted to the liquid and has no injurious effect on the vapors surrounding the Peltier-conductor $k'$ $k^2$, but on the contrary it assists in generating the vapors. Only a small part of the heat generated at the point of connection between the metal rod $k'$ and the support K is transmitted to the liquid. The greater part of it is conducted to the point of connection between the metal rods $k'$ $k^2$ and might injuriously affect the cooling action so that a sufficient quantity of vapors would not be condensed. This defect increases as the current increases, as a strong current produces more heat than a weak current. For the purpose of preventing this the short-circuiting wire $r$ has been provided, which is composed of a thin copper or iron wire. When the strength of the current increases, the thin wire $r$ is heated to a greater extent, its resistance increased correspondingly, so that a greater amount of current is passed through the conductor $k'$ $k^2$, and in consequence thereof the cooling action will be increased and the heat conducted by the rod $k$ to the point of connection of the rods $k'$ $k^2$ neutralized. When the strength of the current decreases, the temperature of the wire $r$ is also decreased and a correspondingly smaller quantity of current passed through the rods $k'$ $k^2$.

For the purpose of excluding the effect of the changes of temperature on the main conductor, the part $p'$, which connects the contact-pieces $a$ $a'$, is made of German silver.

The use of German silver shunts in electric meters is well known and forms no part of this invention.

Having thus described my invention, I claim as new and desire to secure by Letters Patent—

1. The method herein described of measuring electricity, which consists in producing an atmosphere of saturated vapors around a Peltier-conductor, conducting a portion of the current to be measured through said conductor in such a direction as to produce a cooling action in said conductor and collecting and measuring the liquid condensed on said conductor, substantially as set forth.

2. In an electric meter, the combination, with a hermetically closed vessel which is partially filled with a volatile liquid, of a Peltier-conductor arranged above the liquid in said vessel, a drip-cup located between the conductor and the said liquid and a collecting and measuring tube connected with the drip-cup, substantially as set forth.

3. In an electric meter, the combination, with a hermetically-closed vessel partly filled with a volatile liquid, of a Peltier-conductor arranged above the liquid, resistances connecting the main electric conductor with the Peltier-conductor, a drip-cup between the Peltier-conductor and the liquid in said vessel, a collecting and measuring tube connected with the drip-cup and means substantially as described for preventing the escape of the vapors from the closed vessel and the collecting and measuring tube, substantially as set forth.

4. In an electric meter, the combination, with a hermetically-closed vessel partly filled with a volatile liquid, of a shunt-circuit composed of two resistances which are connected through said vessel, a Peltier-conductor interposed between said resistances, above the volatile liquid, a short-circuiting wire connecting the shunt-circuit outside of the closed vessel, a drip-cup located between the Peltier-conductor and the liquid and a collecting and measuring tube connected with said drip-cup, substantially as set forth.

5. In an electric meter, the combination, with a hermetically-closed vessel which is partly filled with a volatile liquid, of a Peltier-conductor arranged above said liquid, resistances connecting said conductor with the main circuit, a drip-cup below the Peltier-conductor, a collecting and measuring tube connected with said drip-cup and means for enlarging the condensing surface of the Peltier-conductor at the point of connection of its metal rods, substantially as set forth.

6. In an electric meter, the combination, with a hermetically-closed vessel which is partly filled with a volatile liquid, of a Peltier-conductor arranged above said liquid, resistances connecting said Peltier-conductor with the main circuit, a drip-cup arranged between the Peltier-conductor and the liquid, a collecting and measuring tube connected with the drip-cup and non-conducting protecting layers or jackets surrounding the closed vessel above the liquid and the collecting and measuring tube, substantially as set forth.

In testimony whereof I have hereunto set my hand in the presence of two subscribing witnesses.

ALOAR ÅBERG.

Witnesses:
HUGO STÜTESBERG,
AXEL AHLBORN.